United States Patent [19]
Sidoti

[11] 3,885,325
[45] May 27, 1975

[54] FLIGHT SIMULATOR

[75] Inventor: Joseph E. Sidoti, Red Bank, N.J.

[73] Assignee: Electronic Associates, Inc., Long Branch, N.J.

[22] Filed: Aug. 3, 1971

[21] Appl. No.: 168,718

[52] U.S. Cl. ............... 35/12 F; 35/12 W; 35/10.2
[51] Int. Cl. ............................................ G09b 9/08
[58] Field of Search ...... 35/12 F, 12 W, 10.2, 12 N; 340/27 AT, 27 NA; 235/184

[56] References Cited
UNITED STATES PATENTS

| | | | |
|---|---|---|---|
| 2,925,667 | 2/1960 | Fogarty | 35/12 W |
| 3,067,529 | 12/1962 | Ziegler | 35/12 F |
| 3,378,938 | 4/1968 | Frasca | 35/12 W |
| 3,471,627 | 10/1969 | Ziegler | 35/12 W X |
| 3,471,942 | 10/1969 | Weitzman et al. | 35/12 W X |
| 3,496,534 | 2/1970 | Andresen, Jr. | 340/27 NA |
| 3,534,486 | 10/1970 | Frasca et al. | 35/10.2 X |
| 3,702,504 | 11/1972 | Cramer | 35/12 W |

Primary Examiner—Robert W. Michell
Assistant Examiner—Vance Y. Hum
Attorney, Agent, or Firm—Bain, Gilfillan & Rhodes

[57] ABSTRACT

A flight simulator comprising a manually operable yoke secured to a spring centering shaft which is both axially movable and rotatable in response to corresponding movement of the yoke, the end of the shaft being operatively connected to a member pivotal in response to axial movement of the shaft, pivotal movement of the said member varying resistance biasing simulated instruments the essential components of which are either reversible motors or volt meters, rotational movement of the said shaft similarly varying resistance biasing such simulated instruments, a pair of rudder pedals secured to a member pivotal about a second shaft, the second shaft rotating in response to pivotal movement of the said member, such rotational movement varying resistance biasing some of such simulated instruments and means for generating the effect of air turbulence on the simulated materials by periodically altering the voltage biases on at least a simulated artificial horizon and a simulated altimeter, and a simulated instrument landing system head operatively connected and responsive to a signal from a simulated directional gyro compass, means for varying the sensitivity of the instrument landing system head with respect to time, and a simulated transponder having means for generating a warning signal responsive to fail to maintain altitude within predetermined limits, and having means to generate a warning signal responsive to the setting of an emergency transponder code where the transponder is set in the on or low mode.

12 Claims, 12 Drawing Figures

FLIGHT SIMULATOR

PREFERRED EMBODIMENT OF INVENTION

The objects and advantages aforesaid as well as other objects and advantages may be achieved by the flight simulator illustrated in the drawings in which.

Figure 1:
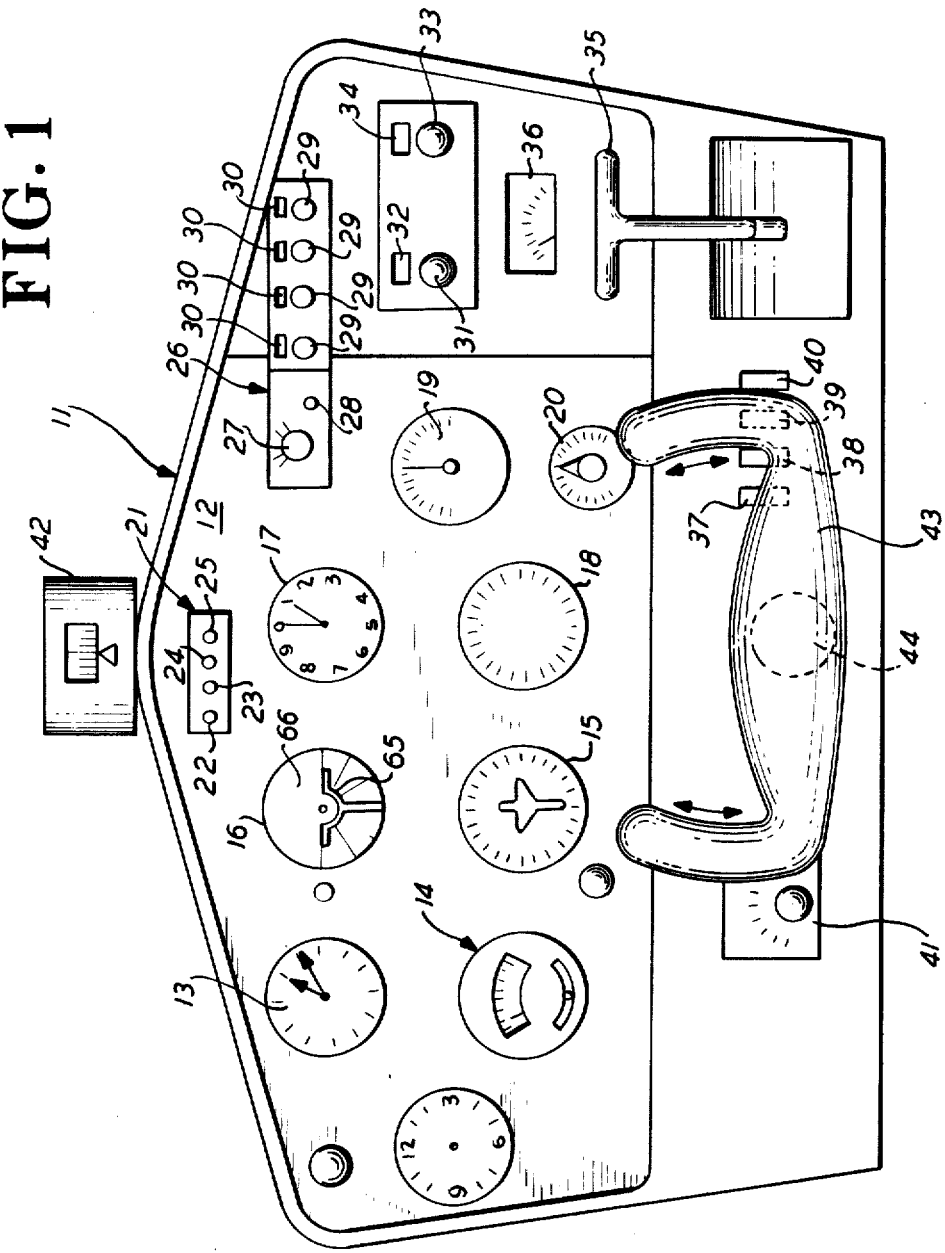
FIG. 1 is a front elevational view of the flight simulator showing the instrument panel.
Figure 2:
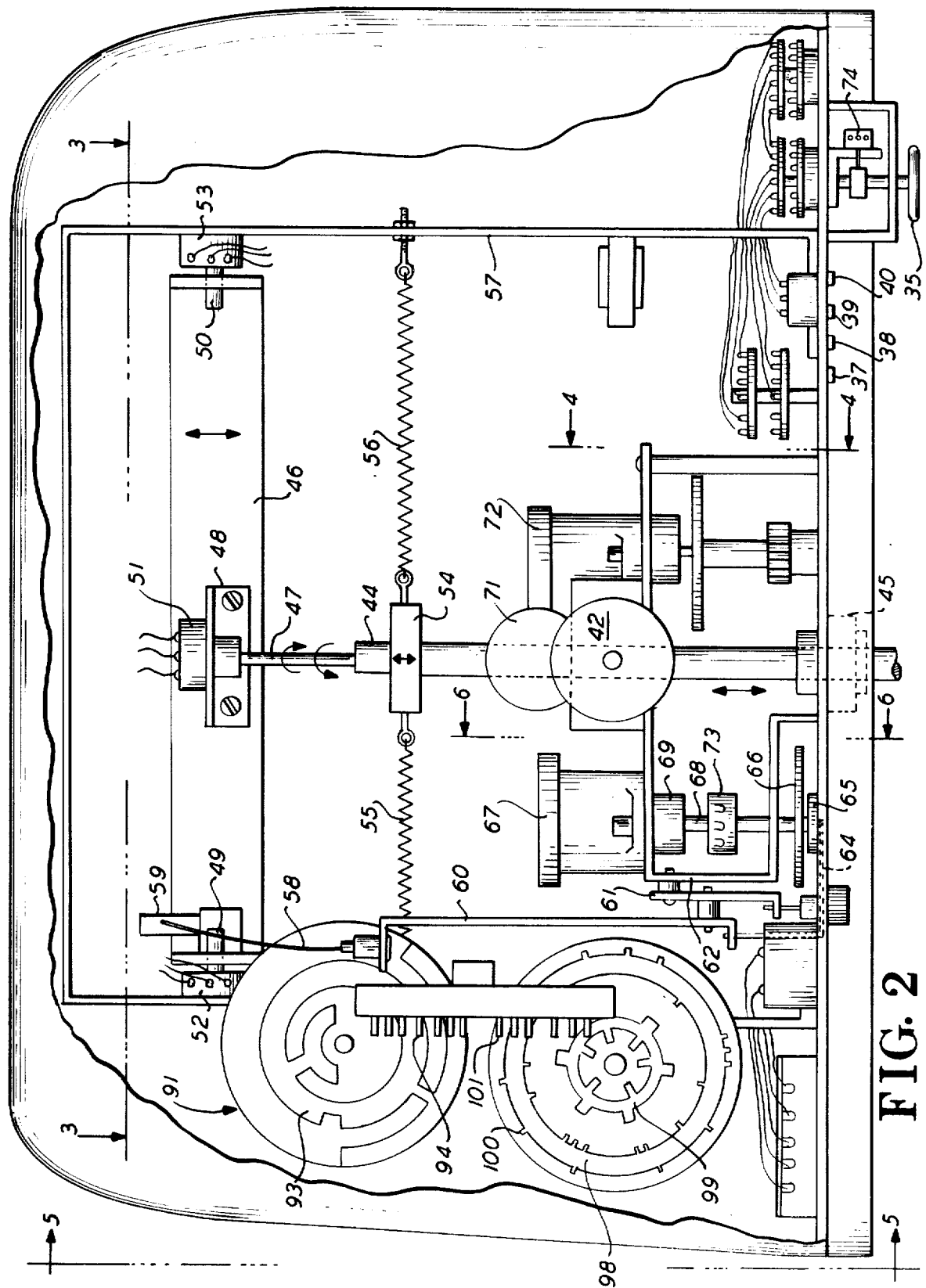
FIG. 2 is a top plan view of the flight simulator with the housing partially broken away.
Figure 3:
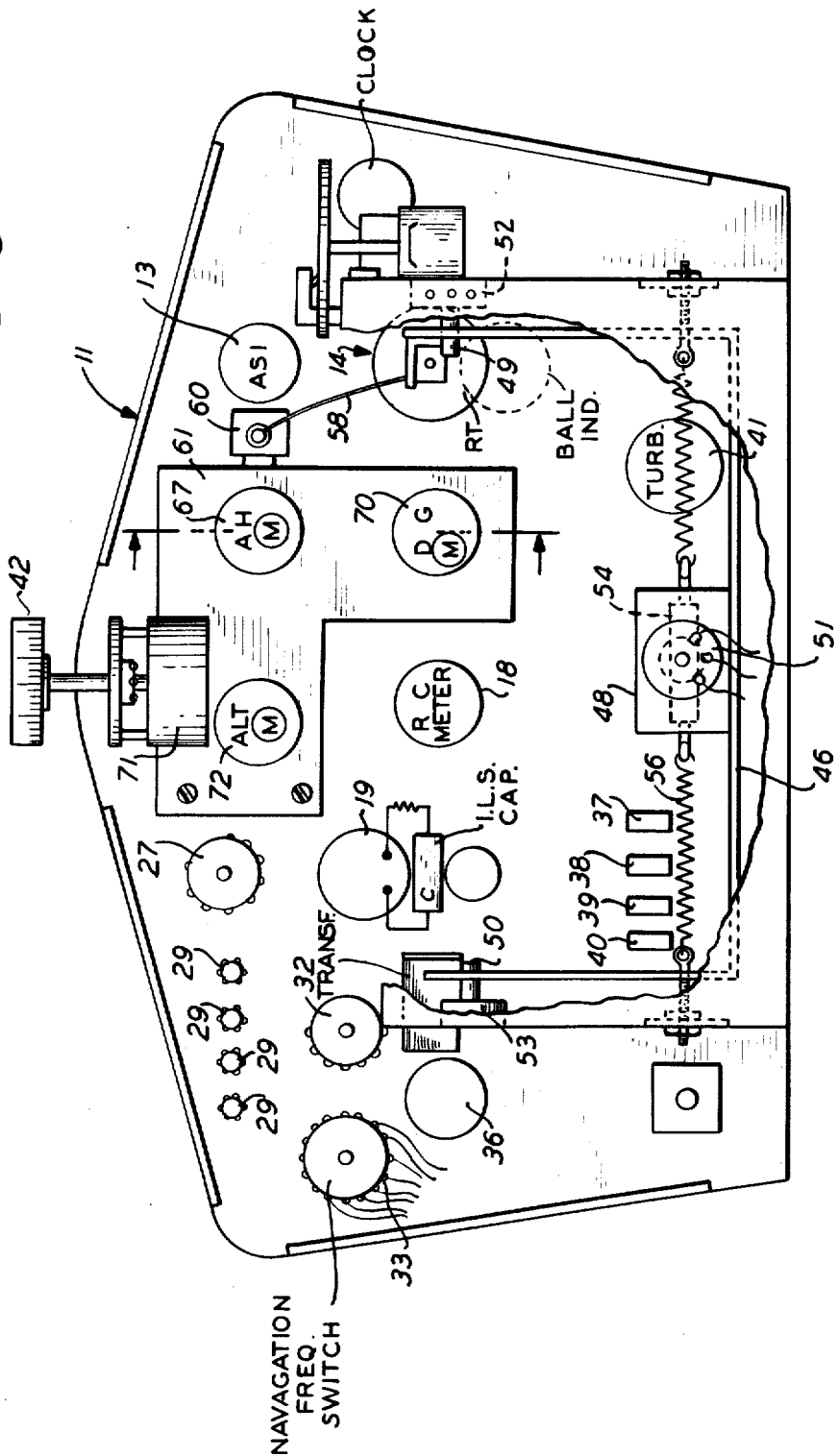
FIG. 3 is a rear elevational view of the flight simulator with the housing removed taken along line 3-3 in FIG. 2 looking in the direction of the arrows.
Figure 4:
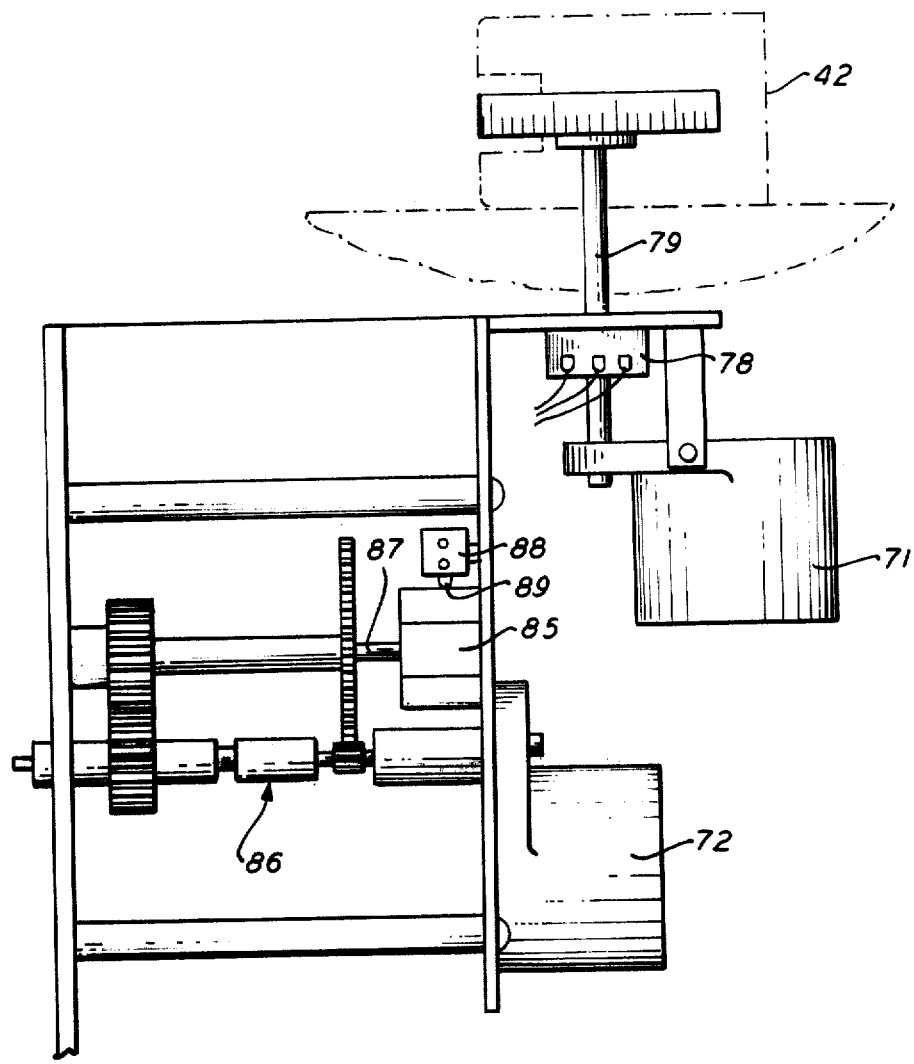
FIG. 4 is a side elevational view taken along line 4-4 in FIG. 2 looking in the direction of the arrows.
Figure 5:
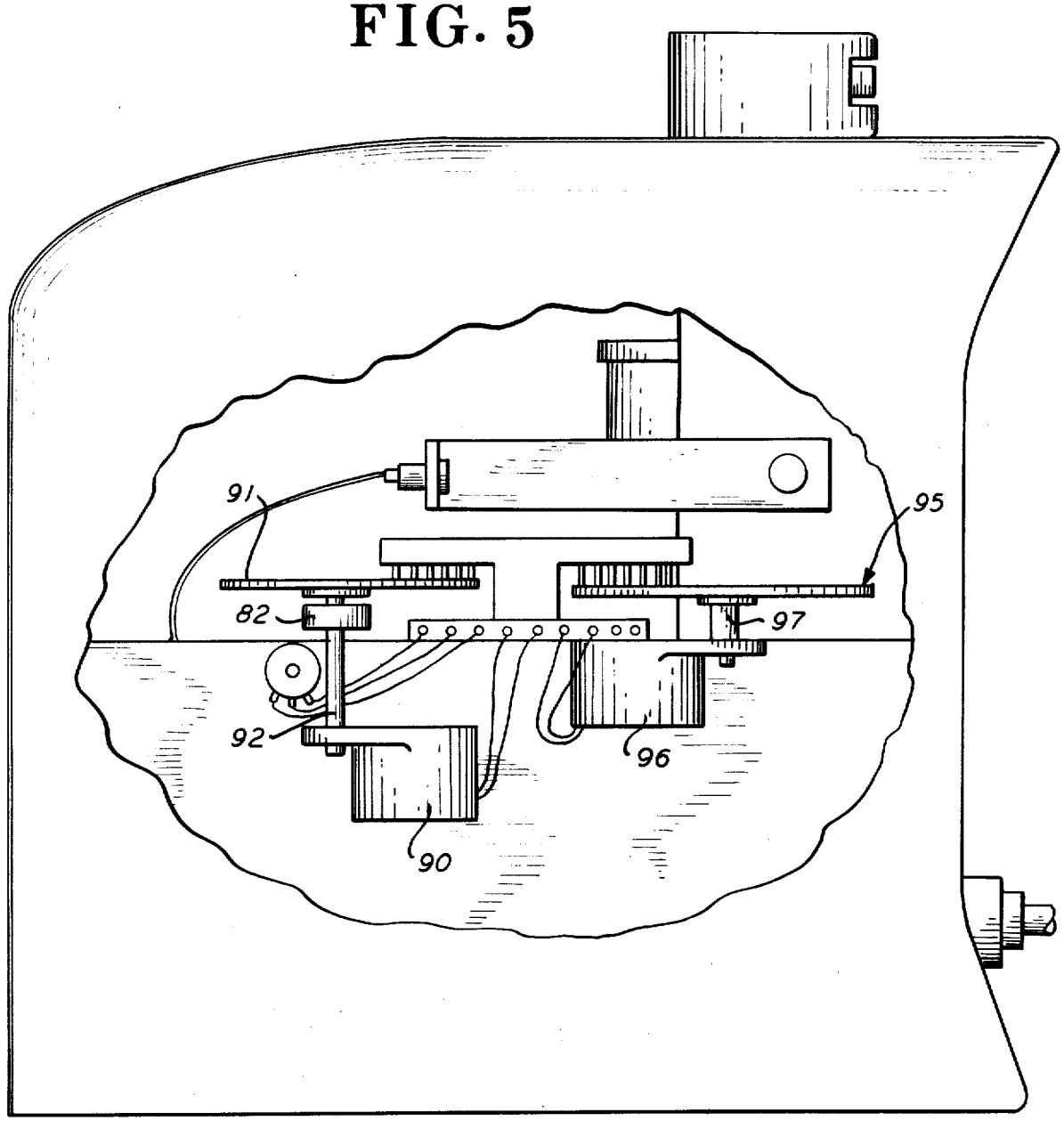
FIG. 5 is a side elevational view taken along line 5-5 in FIG. 2 looking in the direction of the arrows.
Figure 6:
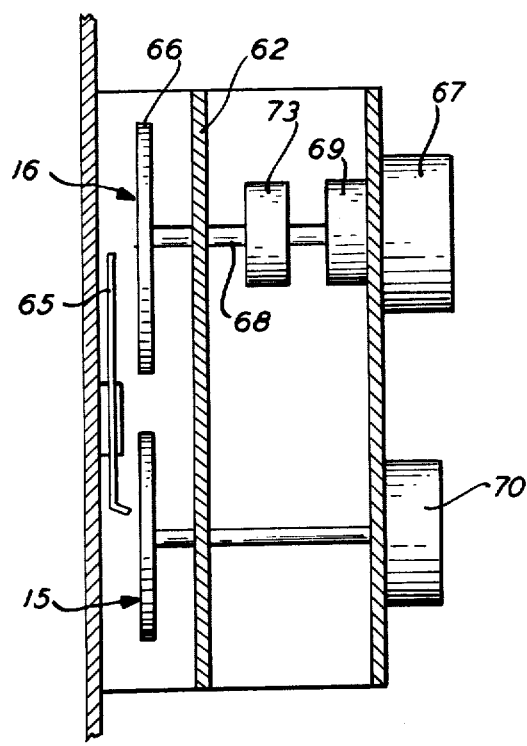
FIG. 6 is a side elevational view taken along line 6-6 in FIG. 2 looking in the direction of the arrows.

Referring now to the drawings in detail, the flight simulator comprises a housing 11 having a front instrument panel 12. The front instrument panel 12 contains simulated instruments normally found in an aircraft for orientation and navigation. The simulated instruments include an air speed indicator 13, a turn and bank indicator 14; a directional gyro compass 15; an artificial horizon 16; altimeter 17; a rate of climb indicator 18; an instrument landing system head 19; and a fuel indicator 20.

In addition, the instrument panel 12 includes a marker beacon receiver panel 21 having an on-off switch 22; an airway marker light 23; an outer marker light 24 and a middle marker light 25.

A transponder 26 is also included on the panel 12 having a mode selector switch 27 which has four posititons, On, Standby, Low and Off. In addition there is an identification button 28 and four frequency code selector switches 29, 29, etc. each having a window 30 to display the code selected by each switch 29, 29, etc.

The panel 12 is also provided with a radio communications frequency selector switch 31 with a complementary display window 32 to display the frequency selected as well as a radio navigational frequency selector switch 33 with a complementary display window 34.

A movable throttle 35 is mounted on the panel 12 beneath a throttle power setting indicator 36.

A master electrical power on-off switch 37 is also mounted on the instrument panel 12 together with a fuel pump switch 38, landing light switch 39 and rotating beacon switch 40.

The instrument panel 12 is also provided with a multi-position turbulence selector switch 41. A magnetic compass 42 is mounted on top of the housing 11 over the panel 12.

The usual, manually operable yoke 43 is mounted on a shaft 44 extending through a bushing 45 in the instrument panel 12 such that the shaft 44 is both rotatable and axially movable.

The principal mechanically movable element within the housing 11 is a pivotable, U-shaped bracket 46 which is connected to the end of the shaft 44 by means of a limitedly flexible, resilient connector 47. A mounting plate 48 on the bracket 46 supports a potentiometer 51 which is generally opposite and operatively connected to and rotatable with the shaft 44 by means of the flexible connector 47. The pivotable bracket 46 is mounted on a pair of opposed shafts 49 and 50 operatively connected to potentiometers 52 and 53 respectively secured to opposite sides of the chassis 57 of the flight simulator.

The shaft 44 is also provided with a block 54 mounted for rotation therewith. The opposite sides of the block 54 are connected to the opposed sides of the chassis 57 by centering springs 55 and 56.

Axial movement of the yoke 43 toward and away from the instrument panel 12 induces responsive movement in the shaft 44. Axial movement of the shaft 44 is transmitted through the flexible connector 47 to induce pivotable movement of the bracket 48. This in turn rotates shafts 49 and 50 changing the resistance of the potentiometers 51 and 52.

Similarly, rotation of the yoke 43 induces rotation of the shaft 44 which is in turn transmitted through the flexible connector 47 to potentiometer 51 changing its resistance. The centering springs 55 and 56 tend to hold the yoke in a neutral position generating the same feel or sense of resistance normally experienced in the yoke of flying aircrafts.

The only other mechanical movement induced by movement of the yoke 43 is through a second, limitedly flexible, resilient connector 58 connected between a rearwardly offset arm 59 on the bracket 46 and a pivotable lever 60. The lever 60 is pivotably mounted to an arm 61 pivotably mounted itself on a bracket 62 attached to the rear of the instrument panel 12. The end of the lever 60 opposite the connector 58 is connected through a linkage 64 to a T-bar indicator 65 in the artificial horizon instrument 16 indicating the position of the nose of the aircraft relative to the horizon line in the artificial horizon 16.

The artificial horizon 16 has a rotatable disc 66 divided into two hemispheres. The dividing line between the hemispheres corresponds to the horizon. The disc 66 in the artificial horizon 16 is driven by a motor 67 which is operatively connected to and biased by the potentiometer 51. Thus, when the yoke 43 is rotated clockwise, a signal energizes motor 67 to drive disc 66 in a counter-clockwise direction. The cross member of the T-bar 65 corresponding to the wings of the aircraft are now inclined to the horizon line on disc 66 as the aircraft would be if the yoke 43 were rotated clockwise. Counter-clockwise rotation of the yoke 43 produces clockwise rotation of the disc 66.

Figure 7:
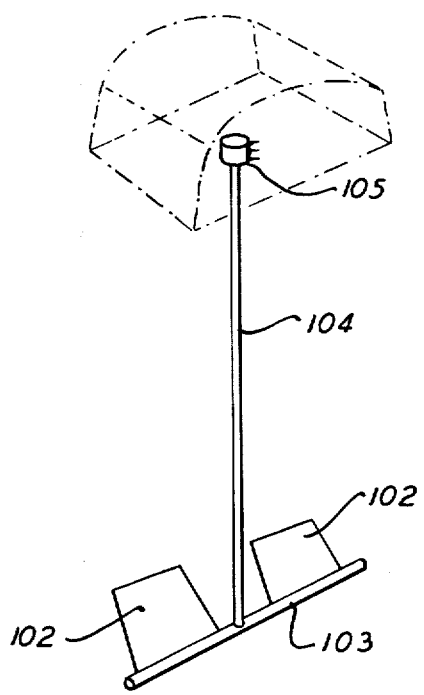
FIG. 7 is a view in perspective of a rudder control assembly.

The shaft 68 upon which the disc 66 is mounted and which is driven by the motor 67 is operatively connected to a potentiometer 69. The potentiometer 69 is operatively connected to and biases a motor 70 governing the movement of the directional gyro compass 15. The potentiometer 69 is also operatively connected to and biases a motor 71 governing the compass heading indicator 42. Thus, rotation of the yoke 43 in a clockwise direction simulates both a right roll as well as a right turn in the aircraft. Alternatively, a rudder assembly such as illustrated in FIG. 7 may be employed for turning the aircraft. Conversely, counter-clockwise rotation of the yoke 43 simulates a left roll as well as a left turn of the aircraft. Of course, motors 67, 70 and 71 are rotatable in both clockwise and counter-clockwise direction depending upon the biasing effect of their governing potentiometers.

Axial movement of the shaft 44 on which the yoke 43 is mounted generates pivotable movement of the bracket 46 and corresponding changes in resistance of potentiometers 52 and 53. Potentiometer 52 is operatively connected to and biases a motor 72 controlling the altimeter 17.

Potentiometer 53 is operatively connected to and biases the air speed indicator 13 which is essentially a volt meter. In addition, pivotable movement of the bracket 46 in response to axial movement of the shaft 44 induces pivotable movement in lever 60 and, from thence, through linkage 64 to the T-bar 65 in the artificial horizon 16. Inward movement of the shaft 44 representing a movement tending to place to aircraft into descent mode causes the horizontal portion of the T-bar 65 to fall beneath the center division or horizon line of disc 66. Conversely, outward movement of the shaft 44 representing a climbing mode for the aircraft causes the horizontal member of the T-bar 65 to move to a position above the middle line of the disc 66.

If an aircraft goes into a very steep roll, it tends to lose vertical lift. In order to simulate this condition, the disc 66 on the artificial horizon 16 is operatively connected to and drives a potentiometer 73 which is operatively connected to and biases the altimeter motor 72.

The rate of turn indicator 14 is simply a volt meter attached across the terminals of motor 70 governing the directional gyro compass 15.

The rate of climb indicator 18 is similarly a volt meter connected across the terminal motor 72 governing the altimeter 17.

The air speed indicator 13 is a volt meter biased by the potentiometer 53. The throttle 35 is operatively connected to and governs the potentiometer 74 which biases the throttle power setting indicator 36 which is essentially a volt meter. Similarly, the potentiometer 74 biases the fuel indicator 20 which is a variable speed timer. The potentiometer 74 also biases the air speed indicator 13. As a result, the air speed indicator 13 is a function of both the position of the yoke 43 as reflected by potentiometer 53 indicating either a climbing or driving mode of operation as well as the setting of the throttle 35 which indicates the amount of power on the engine.

Potentiometer 74 governed by the throttle 35 also biases the altimeter motor 72 such that a low throttle setting will not produce a rise in altitude notwithstanding the position of the yoke 43.

The turn and bank indicator 14 contains two separate meters, a rate of turn indicator 75 and a bank indicator 76. As previously indicated, the rate of turn indicator 75 is simply a volt meter attached across the terminals of motor 70 governing the directional gyro compass 15. However, the bank indicator 76 is a volt meter which picks a signal from the potentiometer 51 on the yoke 43 and compares it with a signal from a potentiometer 77 controlled by the rudders which is input into the directional gyro compass motor 70. The operation of the rudders will be described in greater detail later.

Figure 10:
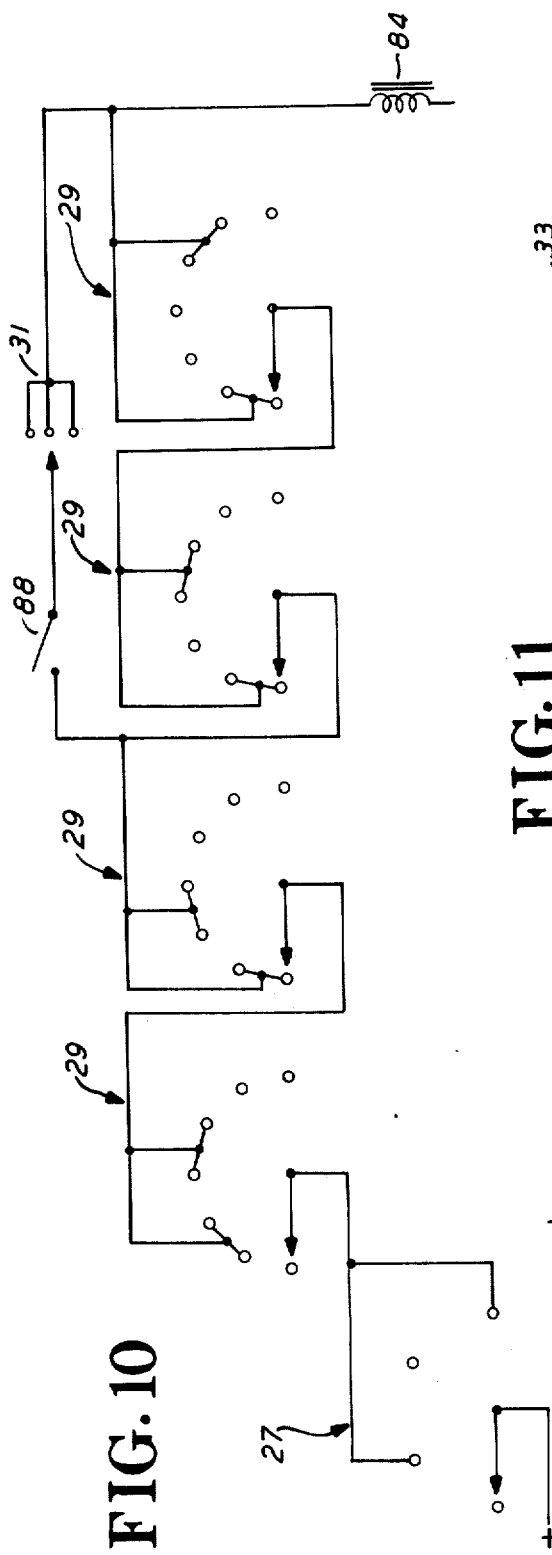
FIG. 10 is a schemmatic wiring diagram of the transponder circuit.
Figure 11:
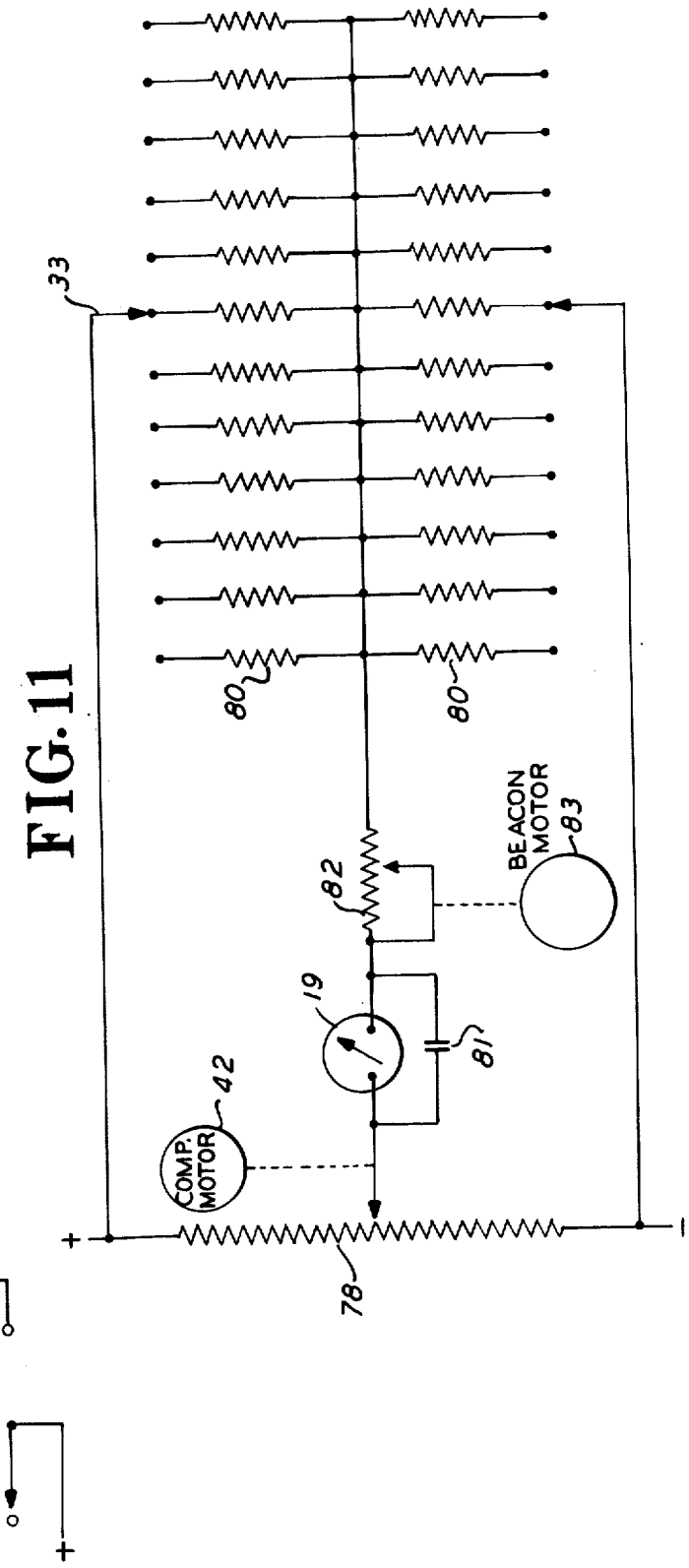
FIG. 11 is a schemmatic wiring diagram of the instrument landing system head.

The instrument landing system head 19 is essentially a volt meter in a bridge circuit illustrated in greater detail in FIG. 10. One-half of the bridge circuit is a variable potentiometer 78, mechanically connected to the shaft 79 on the compass 42. The opposite side of the bridge are a series of paired resistors 80—80, etc. of different values. The null point varies according to the setting of the potentiometer 78. The radio navigational frequency selector switch 33 chooses among the pairs of resistors 80—80 and thereby sets a varying null point for given headings on the compass 42.

Nevertheless, a simple bridge circuit would instantly reflect the null point which is not a proper simulation of the response of the instrument landing system head in an aircraft as it intersects a diverging conical beam. Thus, a time delay has been introduced into the response of the instrument landing system head. The time delay is achieved by connecting a large capacitor 81 in parallel with the instrument landing system head 19. A variable resistor 82 is also connected in series with the instrument landing system head 19 to vary the sensitivity thereof. The variable resistor 82 is mechanically connected to a motor 83 governing the marker beacon receiver 21. The motor 83 is energized with the marker beacon receiver 21 and establishes a time base during which period the sensitivity of the instrument landing system head in increased representing the continued approach of the aircraft toward the instrument landing system beacon which is reflected by increased sensitivity of the instrument landing system head 19.

It should also be noted that in some airports, a back-approach to the instrument landing system beam must be made which results in reverse-sensing on the instrument landing system head 19. In order to achieve simulation of this condition, selected pairs of resistors 80—80 will generate reverse polarity on the instrument landing system head 19.

The transponder 26 on the instrument panel 12 simulates only certain functional results of the opertion of a transponder in an aircraft. For instance, the transponder code selector switches 29 may be set for an emergency code or codes simulating that code set for an emergency in air. A student must be instructed to manipulate the transponder in his aircraft so as to avoid accidentally setting his transponder for its emergency code under conditions which will transmit that emergency frequency unless an actual emergency exists. In order to teach a student proper procedures to avoid accidentally setting and transmitting an emergency code, the simulated transponder 26 will emit an audible signal if the transponder has been accidentally set for the emergency code. The transponder circuit is illustrated in detail in FIG. 9. In actual aircraft operation, the transponder must be set in the standby position when the code selector switches 29 are manipulated otherwise, accidentally the emergency code may be dialed and transmitted if the transponder selector switch 27 is in either the on or low position. Thus, in the transponder 26 in the present flight simulator, if the transponder selector switch 27 is in either the on or low position and the proper sequence of codes dialed by selector switches 29 applied, the buzzer 84 will be energized audibly warning the student that he has failed to place the transponder selector switch 27 in the off or standby position while adjusting the switches 29.

In usual aircraft operation, when the transponder is being employed, the aircraft must be maintained at a fixed altitude assigned by the air controller. The simulated transponder 26 is adapted to warn the student pilot of variations above and below the assigned altitude when the transponder is in operation. This is not the usual mode of operation of a transponder in an aircraft but is extremely useful in a flight simulator to train the student to maintain a proper altitude under given conditions.

In order to generate the audible warning that the aircraft has wandered above or below the assigned altitude, the four code selector switches 29, 29 are employed to set a given transponder code which is assigned by the instructor. The transponder selector switch 27 is set for the on or low position. At this point, the student is unaware that he may be activating the circuit to the alarm 84 warning of deviation from an assigned altitude. The student is given the assigned altitude audibly by his instructor.

Figure 9:
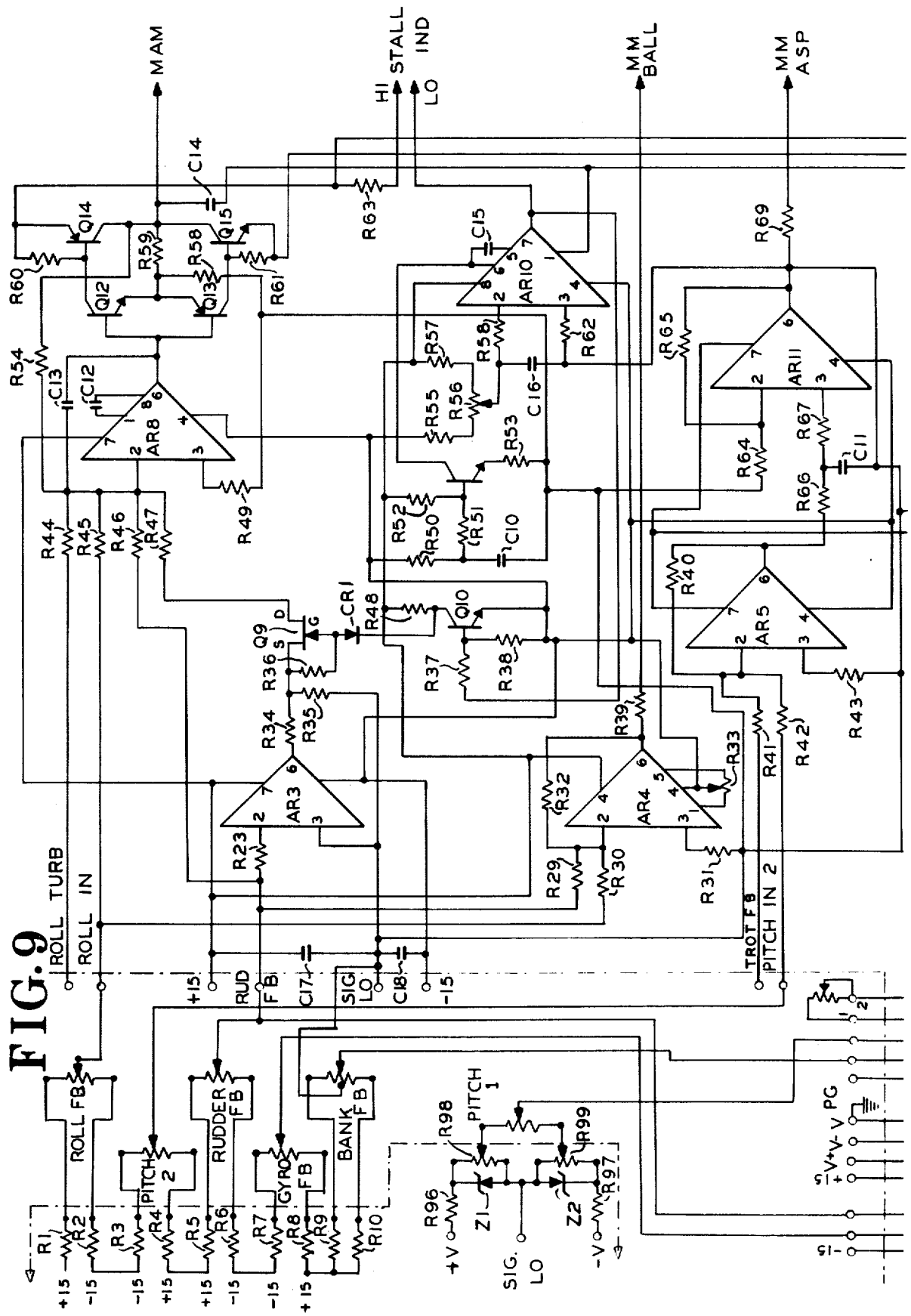
FIGS. 9 and 9A are schemmatic wiring diagrams of the electrical circuit controlling the flight simulator.

Nevertheless, it is undesirable to activate the alarm for improper altitude merely by the code selector switches 29. Therefore, the warning system for altitude variations is also connected in series with the radio communications frequency selector switch 31 which must be at a predetermined position in order to activate the system. In FIG. 9, three selected radio communications frequencies will activate the alarm system.

In order to detect deviations in assigned altitude, a cam 85 is connected to the altimeter motor 72 through a coupling transmission 86. In ordinary altimeters, there are normally two movable indicators, one for hundreds of feets and the other for thousands of feet. If it is desirable to maintain the aircraft within plus or minus 200 feet of an assigned altitude, the cam 85 is attached to the shaft 87 driving the needle indicator for hundreds of feet. A micro switch 88 having a cam-rider 89 engaged to the cam 85 closes whenever the cam-rider 89 is not substantially on a peak of the cam 85. Of course, the cam will function in the same fashion at a plurality of incremental altitudes detecting merely deviation from that assigned altitude. Thus, the transponder selector switch 27, the code selector switches 29 and the radio communications frequency selector switch 31 must be preset to designated positions before the micro switch 88 can energize the buzzer 84. It is necessary to increase the sensitivity of the instrument landing system head 19 as the aircraft approaches the source of the beacon. This sensitivity is increased by means of a device which also energizes the marker beacon receiver lights. When the radio navigational frequency selector switch 33 is properly positioned to a given frequency a motor 90 is energized rotating a disc 91 through a shaft 92. The disc 91 is provided with a plurality of generally annular contact strips 93 which are engageable with a plurality of stationary contact pickups 94 slidably engaged therewith. As the disc 91 rotates the respective contact pickups 94 engage particular strips 93 energizing in sequency the outer marker light 24 and the middle marker light 25. The on-off switch 22 permits the lights to be energized in the marker beacon receiver 21 with the exception that if the marker beacon receiver switch 21 has not been put in the on position, the airway marker light 23 will be energized as the disc 91 rotates thereby warning the student that he has failed to energize his marker beacon receiver when he has set the radio navigational frequency selector switch for his approach to the airport. Note should be made that potentiometer 82 in the variable sensitivity circuit to the instrument landing system head 19 is also coupled to and governed by shaft 92 rotating disc 91 so that as the disc 91 rotates representing an elapse of time as the aircraft approaches the airport, the sensitivity of the instrument landing system head 19 will increase.

It is important to train a student pilot to accommodate for turbulence while solving a variety of navigational problems. Many accidents result from the pilots attention being diverted by navigational problems from the immediate problem of flying the aircraft.

The flight simulator contains means for generating varying degrees of turbulence upon the instruments requiring the student pilot to quickly adjust therefor while solving navigational problems. The instrument panel contains a turbulence selector switch 41. This permits varying degrees of turbulence to be imposed upon the instrumentation.

Turbulence is imposed upon the instruments by means of a second, rotatable disc 95 driven by motor 96 through shaft 97. Motor 96 is energized by switch 41. Selector switch 41 has varying degrees of resistance according to its setting thereby changing the rate of rotation of disc 95.

Disc 95 contains two annular contact strips 98 and 99 each of which has a plurality of spaced apart radial legs 100, 100, etc. on opposite sides thereof. A plurality of pickup contacts 101 are slidably engaged to the disc 95. There are two sets of sliding pickup contacts 101 each containing three contacts, the center of which is continuously engaged to the annular strip 98. The radial legs 100 on opposite sides of the annulus 98 and 99 represent opposite polarities and thereby bias the instruments in an opposite fashion. The contact strips 98 and 99 respectively bias the artificial horizon 16 and the altimeter 17 which in turn effect other instruments by the interlocking as illustrated in the schemmatic diagrams of FIGS. 8, 9 and 9A.

It should also be noted that the radial legs 100 on the annulus 99 are wider than the radial legs on the annulus 98. Annulus 99 biases the altimeter whereas annulus 98 biases the artifical horizon. It is a fact that turbulence which tends to change the altitude of an aircraft lasts for a longer period of time than turbulence which tends to upset or rotate an aircraft about the longitudinal axis. Hence, the dislocations generated by the radial strips 100 on the annulus 99 last for a longer period of time than the dislocations generated by the thinner radial strips 100 on annulus 98.

It should also be borne in mind that the selector switch 41 imposes different degrees of resistance in the circuit itself leading to both the altimeter 17 and the artificial horizon 16 with the result that the amplitude of dislocation varies in accordance with the position of the selector switch in addition to the duration of dislocation.

Referring now to FIG. 7 which is a perspective view of a rudder control assembly, the rudders 102, 102 are affixed to a cross member 103 which is rigidly attached to a vertical bar 104 mounted on the bottom of the flight simulator. A potentiometer 105 is connected to the bar 104 and rotates in response to rotation of the bar 104.

In an aircraft, the rudders actually move forwardly and rearwardly rather than pivot about a pedal mounting. In the simulator, the rudders actually rotate about the bar 104 but move toward and away from the operator as they are manipulated to closely simulate the actual operation of the rudders in an aircraft. Potentiometer 105 biases the directional gyro compass 15.

Figure 8:
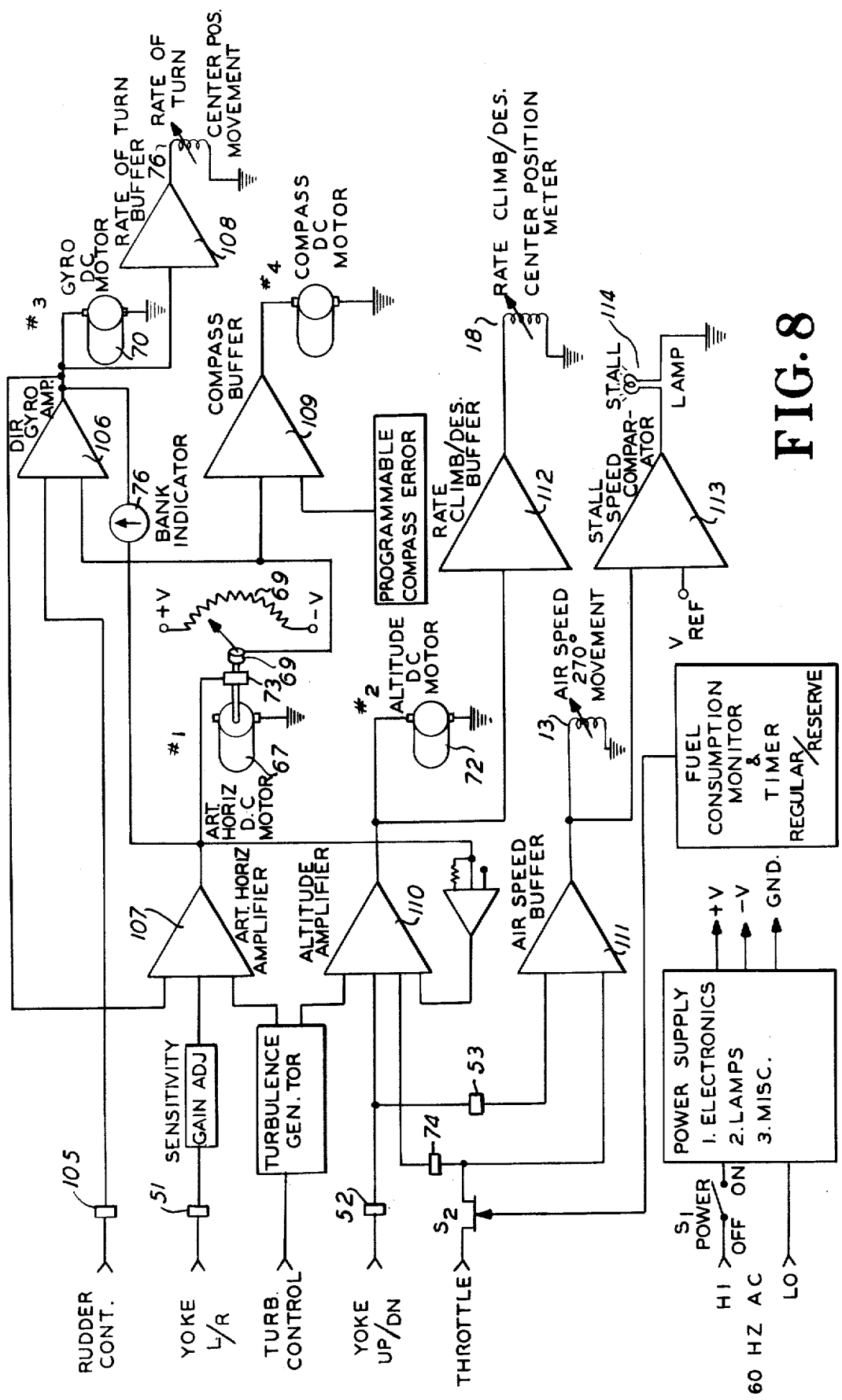
FIG. 8 is a schemmatic diagram of the functional characteristics of the electrical circuit controlling the flight simulator.
Figure 9A:
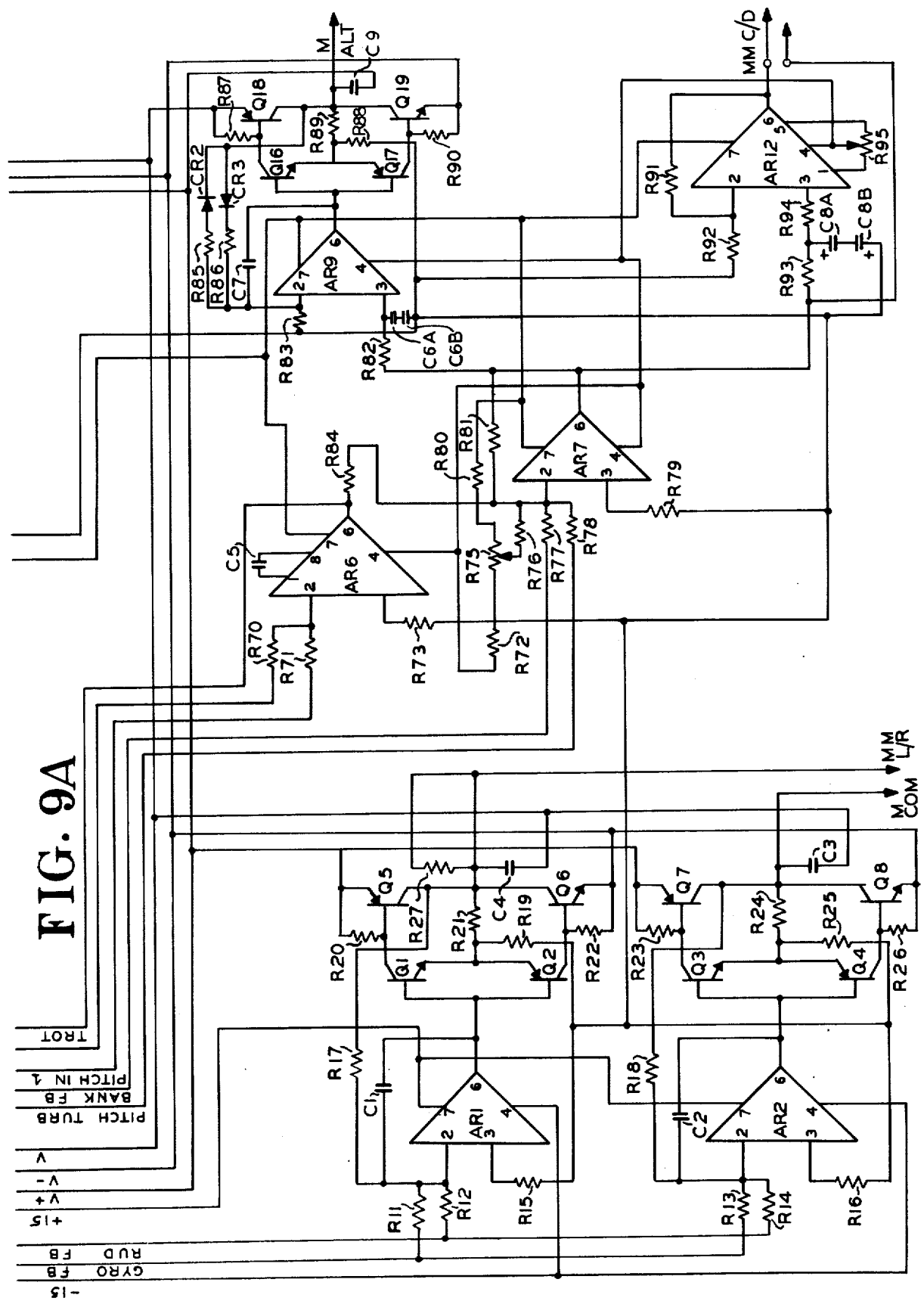

Referring now to the schemmatic diagram of the functional characteristics of the electrical circuit illustrated in FIG. 8, the rudder controls operate potentiometer 105 biasing an operational amplifier 106 which feeds a signal to the motor 70 controlling the directional gyro compass 15.

Rotation of the yoke 43 manipulates a potentiometer 53 biasing an operational amplifier 107 which in turn sends a signal to the motor 67 governing the disc 66 on the artificial horizon 16. Rotation of the shaft 68 governing disc 66 also manipulates potentiometer 69 which biases the operational amplifier 106 governing the directional gyro motor 70.

The output of the operational amplifier 107 to the artificial horizon also is connected to the bank indicator 76 and from there biases the directional gyro motor 70. The signal from the directional gyro operational amplifier 106 also feeds the rate of turn indicator 75 through an appropriate time delay buffer 108.

The flight simulator is adapted to operate with a tape recording giving instructions to the student who then flies a simulated flight hearing instructions from the tape recorder as though coming from control towers including background noise and instructions to other aircraft unrelated to the student.

I claim:

1. Flight simulator for simulating actual flight conditions of an aircraft having a nose and wings, comprising:
   a. a shaft mounted rotatably and axially movable;
   b. a manually operable yoke secured to said shaft and for rotating and moving said shaft axially;
   c. air speed indicator means operatively interconnected to said shaft and responsive to axial movement thereof to provide a change in indication of air speed;
   d. altimeter means operatively connected to said shaft and responsive to axial movement thereof to provide a change in indication of altitude;
   e. artificial horizon means including a rotatable artificial horizon disc divided into two hemispheres by a dividing line corresponding to the horizon, one hemisphere indicating the sky and the other the ground, and said disc being operatively connected to said shaft and being rotatable continuously through 360° in either direction in response to the rotation of said shaft, and further including a T-bar operatively interconnected to said shaft and being moved upwardly and downwardly in response to axial movement thereof, and upon being moved upwardly and downwardly said T-bar indicating the position of said nose of said aircraft relative to the horizon, and upon said artificial horizon disc being rotated relative to said T-bar said T-bar and said disc cooperatively indicating the relative inclination of said aircraft wings with respect to the horizon;
   f. magnetic compass means operatively interconnected to said shaft and operable in response to the rotation of said shaft to provide an indication of change of direction of flight of said aircraft;
   g. gyro compass means operatively interconnected to said shaft and operable in response to rotation of said shaft to provide an indication of change of direction of flight of said aircraft;
   h. turn and bank indicator means including a rate of turn indicator and a bank indicator operatively interconnected to said shaft and operable upon rotation of said shaft to provide an indication of the rate of turn and degree of banking of said aircraft; and
   i. rate of climb indicator means operatively interconnected to said shaft and operable in response to axial movement of said shaft to provide an indication of rate of climb of said aircraft.

2. Flight simulator according to claim 1, further comprising:
   j. a rudder control assembly operatively interconnected to said gyro compass means, said rate of turn indicator, said bank indicator, said rotatable artificial horizon disc, said altimeter means, and said rate of climb indicator means, and said rudder control assembly operable to cause said gyro compass means to provide an indication of change of direction of flight of said aircraft, operable to cause said rate of turn indicator to provide an indication of the rate of turn of said aircraft, and operable to cause said bank indicator to provide an indication of the degree of banking of said aircraft, and operable to rotate said rotatable artificial horizon disc relative to said T-bar to cause said T-bar to provide an indication of the relative inclination of said aircraft wings with respect to the horizon, and operable to cause said altimeter means to provide a change in indication of altitude, and operable to cause said rate of climb indicator means to provide an indication of rate of climb of said aircraft.

3. Flight simulator according to claim 1, further comprising:
   k. manually operable throttle means operably interconnected to said altimeter means, said rate of climb indicator means, and said air speed indicator means, and operable to cause said altimeter means to provide a change in indication of altitude of said aircraft, operable to cause said rate of climb indicator means to provide an indication of rate of climb of said aircraft, operable to cause said air speed indicator means to provide a change in indication of air speed of said aircraft.

4. Flight simulator according to claim 3 further comprising:
   l. manually operable pre-set fuel indicator means, said manually operable throttle means operably interconnected with said manually operable pre-set fuel indicator means to operate said altimeter means, said rate of climb indicator means and said air speed indicator means.

5. Flight simulator according to claim 1, further comprising:
   m. turbulence generator means for simulating the effect of turbulence on said aircraft and being operatively interconnected to said altimeter means and to said rotatable artificial horizon disc and for operating said altimeter means to indicate a change in altitude of said aircraft in response to turbulence and for rotating said artificial horizon disc relative to said T-bar to cause said T-bar to indicate a change in inclination of said aircraft wings with respect to the horizon in response to turbulence.

6. Flight simulator according to claim 5 wherein said turbulence generator means further includes means for operating said altimeter means to indicate a change in altitude of said aircraft in response to turbulence for a longer period of time than said rotatable artificial horizon disc is rotated with respect to said T-bar to indicate a change in the inclination of said aircraft wings with respect to the horizon in response to turbulence.

7. In a flight simulator for simulating actual flight conditions of an aircraft having a nose and wings, the improvement for simulating the response of the aircraft to turbulence, comprising:
  altimeter means for indicating the altitude of said aircraft;
  artificial horizon means including a rotatable artificial horizon disc divided into two hemispheres by a dividing line corresponding to the horizon, and T-bar for indicating the position of said nose of said aircraft relative to the horizon, and upon said artificial horizon disc being rotated relative to said T-bar, said T-bar indicating the relative inclination of said aircraft wings with respect to the horizon; and
  turbulence generator means for simulating the effect of turbulence on said aircraft and being operatively connected to said altimeter means and to said artificial horizon means and for operating said altimeter means to indicate a change in altitude of said aircraft in response to turbulence and for operating said artificial horizon means to indicate a change in the inclination of said aircraft wings with respect to the horizon in response to turbulence.

8. Flight simulator according to claim 7 wherein said turbulence generator means further includes means for operating said altimeter means to indicate a change in altitude of said aircraft in response to turbulence for a longer period of time than said artificial horizon means indicates a change in the inclination of said aircraft wings with respect to the horizon in response to turbulence.

9. In a flight simulator for simulating the effect of turbulence on an aircraft having a nose and wing, the improvement for simulating the effect of turbulence comprising:
  a. altimeter means including rotatable means for indicating the altitude of said aircraft and an altimeter motor for rotating said rotatable means;
  b. artificial horizon means including a rotatable artificial horizon disc divided into two hemispheres by a dividing line corresponding to the horizon, and a T-bar for indicating the position of said nose of said aircraft relative to the horizon, and upon said artificial horizon disc being rotated relative to said T-bar, said T-bar indicating the relative inclination of said aircraft wings with respect to the horizon, and further including an artificial horizon motor for rotating said rotatable artificial horizon disc;
  c. turbulence generator means for simulating the effect of degrees of turbulence on said aircraft including:
    i. a rotatable disc having a pair of annular contact strips provided thereon with each of said annular contact strips being provided with a plurality of spaced apart radial legs positioned on opposite sides thereof;
    ii. two sets of sliding pick-up contacts, one of said set of contacts operatively connected to altimeter motor and for biasing said altimeter motor and the other of said set of contacts operatively connected to said artificial horizon motor and for biasing said artificial horizon motor;
    iii. upon the rotation of said disc one of said set of contacts for slidably engaging one of said plurality of radial legs and for biasing said altimeter motor to cause said altimeter motor to rotate said altimeter rotatable means to indicate a change in altitude of said aircraft in response to turbulence, and the other of said set of contacts for slidably engaging the other of said plurality of radial legs and for biasing said artificial horizon motor to cause said artificial horizon motor to rotate said artificial horizon disc relative to said T-bar thereby indicating a change in the inclination of said aircraft wings relative to the horizon in response to turbulence;
    iv. a motor for rotating said rotatable disc, and,
    v. a turbulence selector switch operatively connected to said motor and for operating said motor.

10. Flight simulator according to claim 9 wherein said plurality of radial legs slidably engaged by said one set of sliding pick-up contacts operatively connected to said altimeter motor are wider than said plurality of radial legs slidably engaged by said other set of sliding pick-up contacts operatively connected to said artificial horizon motor whereby upon rotation of said turbulence generator rotatable disc said altimeter means are operated to indicate a change in altitude of said aircraft in response to turbulence for a longer period of time than said artificial horizon means indicate a change in the inclination of said aircraft wings with respect to the horizon in response to turbulence.

11. In a flight simulator for simulating the effect of varying turbulence on an aircraft having a nose and wing, the improvement for simulating the effect of varying turbulence comprising:
  a. altimeter means including rotatable means for indicating the altitude of said aircraft and an altimeter motor for rotating said rotatable means;
  b. artifical horizon means including a rotatable artificial horizon disc divided into two hemispheres by a dividing line corresponding to the horizon, and a T-bar for indicating the position of said nose of said aircraft relative to the horizon, and upon said artificial horizon disc being rotated relative to said T-bar, said T-bar indicating the relative inclination of said aircraft wings with respect to the horizon, and further including an artificial horizon motor for rotating said rotatable disc;
  c. turbulence generator means including:
    i. a rotatable disc having a pair of annular contact strips provided thereon with each of said annular contact strips being provided with a plurality of spaced apart radial legs positioned on opposite sides thereof,
    ii. two sets of sliding pick-up contacts, one of said set of contacts being operatively connected to said altimeter motor and the other of said set of contacts being operatively connected to said artificial horizon motor,
    iii. upon the rotation of said disc, one of said set of contacts for slidably engaging one of said plurality of radial legs and for biasing said altimeter motor to cause said altimeter motor to rotate said altimeter rotatable means to indicate a change in altitude of said aircraft in response to turbulence, and the other of said set of contacts for slidably engaging the other of said plurality of radial legs and for biasing said artificial horizon motor to cause said artificial horizon motor to rotate said artificial horizon disc relative to said T-bar thereby indicating a change in the inclination of said aircraft wings relative to the horizon in response to turbulence;

iv. a motor for rotating said rotatable disc, and v. a variable turbulence selector switch operatively connected to said motor and having a plurality of settings for selectively varying the speed of said motor and thereby the rate of rotation of said rotatable disc and thereby the bias of said altimeter and said artificial horizon motors and thereby, respectively, producing a variable indication in the change in altitude of said aircraft and an indication of variable change in inclination of said aircraft wings relative to the horizon in response to varying turbulence.

12. Flight simulator according to claim 11 wherein said plurality of radial legs slidably engaged by said one set of sliding pick-up contacts operatively connected to said altimeter motor are wider than said plurality of radial legs slidably engaged by said other set of sliding pick-up contacts operatively connected to said artificial horizon motor whereby upon rotation of said turbulence generator rotatable disc said altimeter means are operated to indicate a change in altitude of said aircraft in response to turbulence for a longer period of time than said artificial horizon means indicate a change in the inclination of said aircraft wings with respect to the horizon in response to turbulence.

* * * * *